(12) United States Patent
Swartzlander, Jr. et al.

(10) Patent No.: US 8,407,274 B2
(45) Date of Patent: Mar. 26, 2013

(54) MACHINE DIVISION

(75) Inventors: Earl E. Swartzlander, Jr., Austin, TX (US); Inwook Kong, Seoul (KR)

(73) Assignee: The Board of Regents of the University of Texas System, Austin, TX (US)

( * ) Notice: Subject to any disclaimer, the term of this patent is extended or adjusted under 35 U.S.C. 154(b) by 440 days.

(21) Appl. No.: 12/785,040

(22) Filed: May 21, 2010

(65) Prior Publication Data

US 2011/0289131 A1 Nov. 24, 2011

(51) Int. Cl.
*G06F 7/535* (2006.01)
(52) U.S. Cl. ........................................................ 708/653
(58) Field of Classification Search .................. None
See application file for complete search history.

(56) References Cited

U.S. PATENT DOCUMENTS

| | | | | |
|---|---|---|---|---|
| 3,508,038 | A | 4/1970 | Goldschmidt et al. | 235/164 |
| 5,737,255 | A * | 4/1998 | Schwarz | 708/551 |
| 8,103,712 | B2 * | 1/2012 | Bailey et al. | 708/653 |
| 2010/0281087 | A1 * | 11/2010 | Powell | 708/209 |

OTHER PUBLICATIONS

Robert E. Goldschmidt; "*Applications of Division by Convergence*"; Submitted in partial fulfillment of the requirements for the Degree of Master of Science; Massachusetts Institute of Technology; Jun. 1964; pp. 1-44.
Masayuki Ito et al.; "*Efficient Initial Approximation and Fast Converging Methods for Division and Square Root*"; Proceedings of the 12th IEEE Symposium on Computer Arithmetic; 1995; pp. 2-9.
Stuart F. Oberman and Michael J. Flynn; "Division Algorithms and Implementations"; *IEEE Transactions on Computers*; vol. 46; No. 8; Aug. 1997; pp. 833-854.
Milos D. Ercegovac et al.; "*Improving Goldschmidt Division, Square Root, and Square Root Reciprocal*"; IEEE Transactions on Computers; vol. 49; No. 7; Jul. 2000; pp. 759-766.
Jose-Alejandro Pineiro et al.; "*High-Speed Double-Precision Computation of Reciprocal, Division, Square Root, and Inverse Square Root*"; IEEE Transactions on Computers; vol. 51; No. 12; Dec. 2002; pp. 1377-1388.
Guy Even et al.; "*A Parametric Error Analysis of Goldschmidt'S Division Algorithm*"; Proceedings of the 16th IEEE Symposium on Computer Arithmetic; 2003; pp. 165-171.
D. Piso and J. D. Bruguera; "*Optimizing the Multiplier Desing for Goldschmidt'S Division and Reciprocal Units*"; XXI Conference on Design of Circuits and Integrated Systems; Barcelona, Spain; 2006; sec. 1C.3.
Michael J. Schulte et al. "*Floating-Point Division Algorithms for an X86 Microprocessor With a Rectangular Multiplier*" 25th International Conference on Computer Design; 2007; pp. 304-310.

* cited by examiner

*Primary Examiner* — David H Malzahn
(74) *Attorney, Agent, or Firm* — Dorsey & Whitney LLP (57) ABSTRACT

Techniques are generally described that include methods, devices, systems and/or apparatus for dividing a numerator by a denominator. Some example methods may include selecting a first numerical factor stored in an electronic storage media. The first numerical factor may be multiplied by a numerator at least in part using a first logic circuit configured to perform multiplication. The first numerical factor may also be multiplied by a denominator. A second numerical factor may be calculated based, at least in part, on an approximation of a square of the difference between unity and the product of the first numerical factor and the denominator. The second numerical factor may be multiplied by the product of the numerator and the first numerical factor at least in part using the first logic circuit, to generate an approximation of a quotient of the numerator and the denominator.

21 Claims, 5 Drawing Sheets

MACHINE DIVISION

BACKGROUND

Unless otherwise indicated herein, the materials described in this section are not prior art to the claims in this application and are not admitted to be prior art by inclusion in this section.

Computing devices generally may perform mathematical operations such as addition, multiplication, and division. The manner in which mathematical operations are performed in hardware may affect the overall performance of the computing system.

Goldschmidt division is a technique for performing division in a computing device. Goldschmidt division is described, for example, in R. E. Goldschmidt, "Applications of Division by Convergence," Master's thesis, M.I.T., 1964 and S. F. Oberman et al. "Division algorithms and implementations," *IEEE Trans. Computers*, vol. 46, pp. 833-854, 1997, both of which are hereby incorporated by reference in their entirety for any purpose.

Goldschmidt division generally involves iteratively multiplying the numerator and denominator by a numerical factor. The numerical factor is selected or calculated to cause the denominator to converge towards unity. The product of the numerical factor and the numerator may then approximate the quotient.

For example, consider a division Q=N/D, where Q is the quotient, N is the numerator, and D is the denominator. To begin, both N and D are multiplied by an initial numerical factor $F_0$. The numerical factor $F_0$ may be selected from a stored table, and may be an approximate reciprocal of D to make the product $F_0D$ close to 1. Since $F_0$ is selected from a finite number of choices stored in the table, the product $F_0D$ will have an error $\epsilon_0=(1-D_0)$. The approximated quotient following this initial multiplication may be represented as follows:

$$Q_0 = \frac{N \times F_0}{D \times F_0} = \frac{N_0}{1 - \varepsilon_0}$$

At the i-th Goldschmidt iteration, the factor $F_i$ and the quotient $Q_i$ may be computed as follows:

$$F_i = (2 - D_{i-1}) = 1 + \varepsilon_0^{2^{i-1}};$$

$$Q_i = \frac{N_i}{D_i} = \frac{N_{i-1}F_i}{D_{i-1}F_i} = \frac{N_{i-1}\left(1 + \varepsilon_0^{2^{i-1}}\right)}{(1 - \varepsilon_0^{2^i})}$$

The numerical factor $F_i$ may be computed by taking a one's complement of $D_{i-1}$, which may be convenient for machine applications. The one's complement generally refers to changing the value of each bit in a string of bits representing the value $D_{i-1}$. The one's complement may be a relatively simple operation for processors, and accordingly it may compute numerical factors $F_i$ in this manner.

As the iterations progress, $N_i$ may converge toward Q with ever greater precision. Since the error of each iteration decreases by $\epsilon_0^{2^i}$, the convergence order of Goldschmidt division is referred to as quadratic.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

In the drawings.

SUMMARY

Techniques are generally described that include methods and devices.

An example method may include selecting a first numerical factor stored in an electronic storage media. The first numerical factor may be multiplied by a numerator at least in part using a first logic circuit configured to perform multiplication. The first numerical factor may also be multiplied by a denominator. A second numerical factor may be calculated based, at least in part, on an approximation of a square of the difference between unity and the product of the first numerical factor and the denominator. The second numerical factor may be multiplied by the product of the numerator and the first numerical factor at least in part using the first logic circuit, to generate an approximation of a quotient of the numerator and the denominator.

Another example method may include receiving a first digital representation of a denominator value from a previous Goldschmidt iteration. The method may also include generating a second digital representation of an error comprising a plurality of bits, wherein the error is based, at least in part, on a difference between unity and the denominator value from the previous Goldschmidt iteration. A number of bits of the second digital representation may be selected, wherein the number is less than a total number of the plurality of bits. A square of the value represented by the selected number of bits of the second digital representation may be calculated. The error and the square of the value may be summed, at least in part, to generate a next numerical factor for use in Goldschmidt division.

An example apparatus for dividing a numerator by a denominator is also described. An example apparatus may include one or more of a multiplier circuit, an error generator circuit, a square circuit, and/or a Booth encoder circuit. The multiplier circuit may have a first input terminal, a second input terminal, and a first output terminal. The multiplier circuit may be configured to receive a digital representation of a first value at the first input terminal, a digital representation of a second value at the second input terminal, and may be configured to provide an output signal representing a product of the first and second values at the first output terminal. The error generator circuit may have a third input terminal coupled to the first output terminal of the multiplier circuit, and a second output terminal. The error generator circuit may be configured to receive the output signal from the multiplier circuit at the third input terminal and generate an error signal at the second output terminal. The square circuit may have a fourth input terminal coupled to the second output terminal of the error generator circuit, and a third output terminal. The square circuit may be configured to receive selected bits of the error signal and generate a digital representation of a square of the selected bits of the error signal at the third output terminal. The selected bits may be fewer than a total number of bits of the error signal. The Booth encoder circuit may have a fifth input terminal coupled to the second output terminal of the error generator circuit and a sixth input terminal coupled to the third output terminal of the square circuit. The Booth encoder circuit may be configured to encode the error signal and the digital representation of the square of the selected bits in accordance with a Booth encoding technique. The Booth encoder circuit may be further coupled to the multiplier and configured to provide the encoded error signal and encoded digital representation of the square of the selected bits to the first input terminal of the multiplier.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is generally drawn, inter alia, to methods, systems, devices, and/or apparatus for dividing a numerator by a denominator. Some example methods may include selecting a first numerical factor stored in an electronic storage media. The first numerical factor may be multiplied by a numerator at least in part using a first logic circuit configured to perform multiplication. The first numerical factor may also be multiplied by a denominator. A second numerical factor may be calculated based, at least in part, on an approximation of a square of the difference between unity and the product of the first numerical factor and the denominator. The second numerical factor may be multiplied by the product of the numerator and the first numerical factor at least in part using the first logic circuit, to generate an approximation of a quotient of the numerator and the denominator.

It may be advantageous in some examples to compute numerical factors for use in Goldschmidt division in a manner which allows for faster convergence of the quotient. For example, to achieve cubic convergence, numerical factors may be calculated in accordance with the equation:

$$F_i = 1 + \epsilon_{i-1} + (\epsilon_{i-1})^2$$

The computational load for computing $F_i$ in this manner may however be higher than that required for the quadratic convergence method. In particular, computing $F_i$ may require both an addition and a squaring operation. The squaring operation may be relatively computationally intensive. Without being bound by theory, example systems and methods are described below which may conduct Goldschmidt division with faster than quadratic convergence. The systems and methods below may in some examples approach cubic convergence. As will be described further below, in some examples, approximate squaring may be used to reduce the computational complexity of the squaring operation. A selected number of bits of a digital representation of a value may be squared in some examples, providing an approximation of the square of the value. Furthermore, in some examples, complexity may be reduced by providing the approximate square and the error as inputs to a Booth multiplier circuit. This may reduce or eliminate the need to separately add the error and the approximate square, as the addition may effectively be performed by the operation of the Booth multiplier circuit, as will be described further below.

Figure 1:
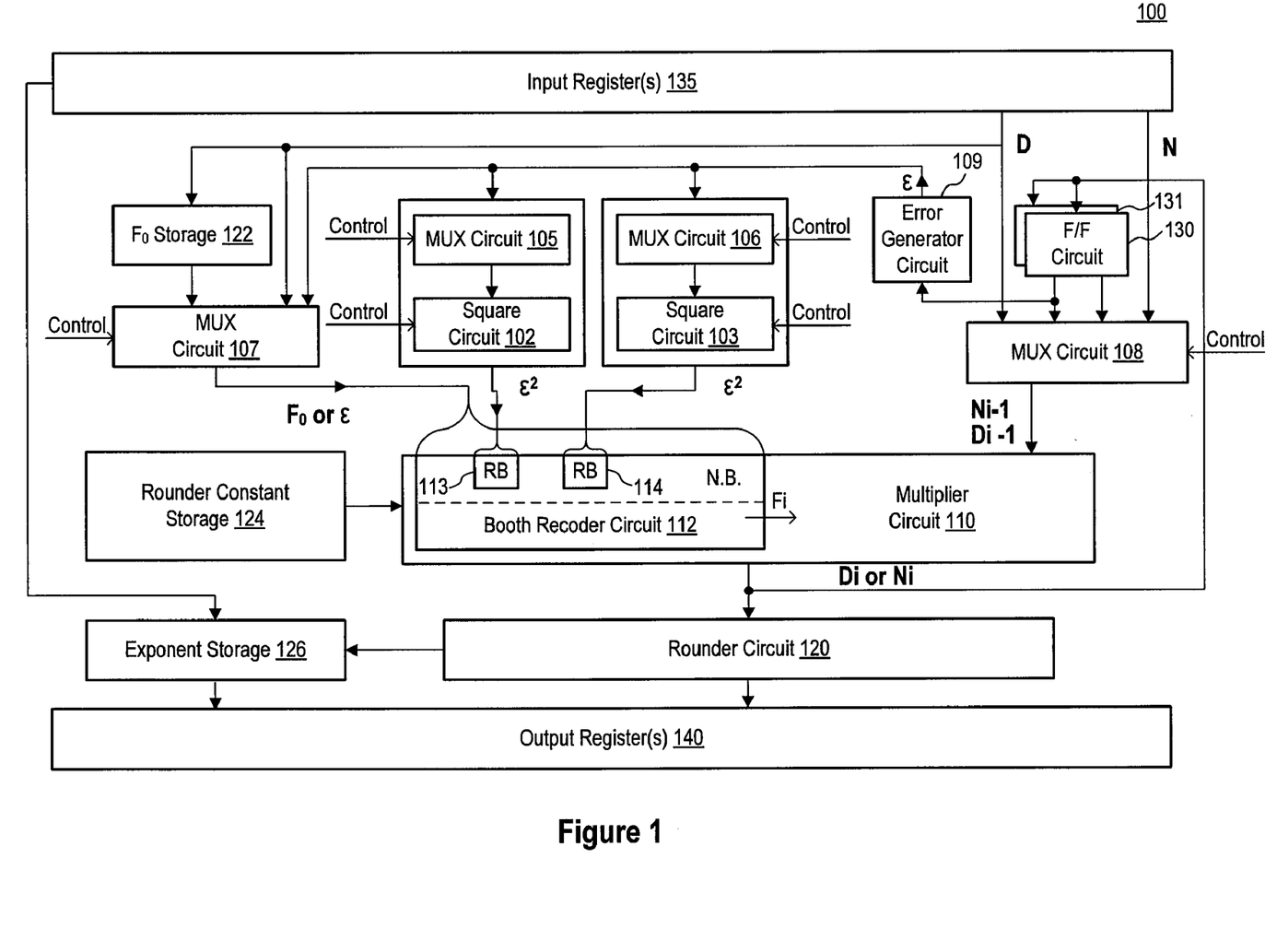
FIG. 1 is a schematic illustration of an apparatus for performing division.

FIG. 1 is a schematic illustration of an apparatus for performing division arranged in accordance with at least some examples of the present disclosure. The apparatus 100 may include square circuits 102 and 103, multiplexer circuits 105-108, an error generator circuit 109, a multiplier circuit 110, a Booth recoder circuit 112 including redundant Booth recoders 113-114, a round circuit 120, $F_0$ storage 122, round constant storage 124, exponent storage 126, flip-flop circuits 130-131, input registers 135, and/or output registers 140. A controller, not shown in FIG. 1, may also be included in apparatus 100.

The blocks illustrated in FIG. 1, including for example, the square circuits 102 and 103, multiplexer circuits 105-108, error generator circuit 109, multiplier circuit 110, Booth recoder circuit 112, rounder circuit 120, and flip-flop circuits 130-131 may represent functional blocks of the apparatus 100, physical blocks of the apparatus 100, or a combination of functional and physical blocks. In some examples, one or more of the blocks shown may be combined into a fewer number of physical circuits for a particular implementation. In some examples, more than one physical circuit may be used to implement a particular block shown in FIG. 1.

The input registers 135 may be coupled to an input of the multiplexer circuit 108, an input of the multiplexer circuit 107, the $F_0$ storage 122, and the exponent storage 126. An input of the multiplexer circuit 108 may be coupled to an output of the flip-flop circuits 130, 131. An output of the multiplexer circuit 108 may be coupled to an input of the multiplier circuit 110. An output of the flip-flop circuits 130, 131 may also be coupled to the error generator circuit 109. The error generator circuit 109 may be coupled to an input of the multiplexer circuits 105-107. The square circuit 102 may be coupled to the multiplexer circuit 105 and the redundant Booth recoder 113. The square circuit 103 may be coupled to the multiplexer circuit 106 and the redundant Booth recoder 114. An output of the multiplexer circuit 107 may be coupled to the Booth recoder circuit 112. An output of the multiplier circuit 110 may be coupled to rounder circuit 120, which may be coupled to the exponent storage 126. The exponent storage 126 and the rounder circuit 120 may be coupled to the output registers 140.

During operation, digital representations of a numerator (N) and a denominator (D) may be received and stored at one or more of the input registers 135. The digital representations may be received, for example, from an arithmetic logic unit (ALU) of a microprocessor, or a DSP, or some other processing circuit. The digital representations may be bit sequences representative of the numerator and denominator values. During a first iteration of the division, the multiplexer circuit 108 may provide the digital representation of the denominator to the multiplier circuit 110.

An initial numerical factor $F_0$ may be retrieved from the $F_0$ storage 122. The numerical factor may be selected by a controller (not explicitly shown in FIG. 1) based on the value of the denominator, where the controller is configured to initiate retrieval based upon the selected numerical factor. That is, in some examples, the factor $F_0$ is selected from a finite number of stored numerical factors by selecting the factor $F_0$ which is nearest the reciprocal of the denominator.

During a first iteration of the division, the multiplexer circuit 107 may be configured to provide the selected numerical factor $F_0$ to the multiplier circuit 110. The multiplexer circuit 107 may receive a control signal at a control terminal from a microcontroller (not shown in FIG. 1) indicative of the first iteration of a division. Responsive to the control signal, the multiplexer circuit 107 may select the numerical factor $F_0$ input to provide to the Booth recoder circuit 112. The multiplier circuit 110 may be configured to multiply the denominator and the numerical factor $F_0$ and output a digital representation of the product, which may be stored in the flip-flop circuits 130 for use in the next iteration. Continuing with the first iteration, the multiplexer 108 may receive a control signal from a microcontroller (not shown in FIG. 1) indicative of the first iteration, and may be configured to provide the digital representation of the numerator (N) to the multiplier circuit 110 responsive to the indication of the first iteration. The multiplier circuit 110 may output a digital representation of the value of the numerator multiplied by the selected numerical factor $F_0$, which may also be stored in the flip-flop circuits 130,131 for use during later iterations.

Generally, any number of flip-flop circuits 130, 131 may be provided in accordance with the amount of storage desired and a number of cycles during which values should be stored. In the example of FIG. 1, one flip-flop circuit may be configured to store updated values of a denominator $D_i$ following each iteration, while the other flip-flop circuit may be configured to store updated values of a numerator $N_i$. This may allow components during the next iteration to access the numerator and denominator from the last iteration ($D_{i-1}$).

During a next iteration, the error generator circuit 109 may be configured to generate a digital representation of an error (i.e., an error value $\epsilon$) in the denominator $D_{i-1}$ from a previous iteration stored in the flip-flop circuits 130,131. During the second iteration, the denominator from the last iteration may be equal to the initial denominator provided to the input registers 135 multiplied by the first factor $F_0$. The error may be calculated by the error generator circuit 109, for example, by taking a one's complement of the digital representation of the denominator. The error may at least partially represent a difference between the numeral one ("1") and the previous denominator value.

The error value may be provided by the error generator circuit 109 to the multiplexer circuits 105-107. The multiplexer circuits 105, 106 may each be configured to select certain bits of the digital representation of the error (i.e., the error value) and provide the selected bits to a respective one of the square circuits 102, 103. The multiplexer circuits 105, 106 may receive a control signal from a microcontroller (not shown in FIG. 1), and may enable and select bits responsive to the control signal. In some examples, the control signal may specify which bits are selected by the multiplexer circuits 105, 106. In some examples, the multiplexer circuits 105, 106 are coupled to selected bits of a bus carrying the error value, and the multiplexer circuits 105, 106 are enabled responsive to the control signal. Although two multiplexer circuits 105, 106 and two square circuits 102, 103 are shown, any number may be used. In some examples, both a multiplexer circuit and a corresponding square circuit is provided for each corresponding iteration of division in which the apparatus 100 may calculate a numerical factor using a squared term. That is, the square circuit 102 and multiplexer circuit 105 may be enabled during one iteration of the division to select and square a first set of bits of the error value. The square circuit 103 and the multiplexer circuit 103 may be enabled during another iteration of the division to select and square a second set of bits of the error value. In some other examples, a single multiplexer circuit and a single square circuit may be provided and used to select and square a different set of bits of the error value during each of multiple iterations.

Although two multiplexer circuits 105, 106 and two square circuits 102, 103 are shown, any number may be used. In some examples, both a multiplexer circuit and a corresponding square circuit is provided for each corresponding iteration of division in which the apparatus 100 may calculate a numerical factor using a squared term. In some other examples, a single multiplexer circuit and a single square circuit is provided and used during multiple iterations.

During this second iteration, the multiplexer circuit 105 may be configured to enable the square circuit 102 and provide the square circuit 102 with selected bits of the digital representation of the error generated by the error generator circuit 109. The value represented by the selected number of bits is squared by the square circuit 102, and a digital representation of the value of the square of the selected number of bits may be provided to the redundant binary Booth encoder circuit 113. By squaring the value of the selected number of bits of the digital representation of the error, an approximation of the square of the error may be generated without enduring all of the computational expense to calculate the square of the entire error. Any number of bits may be selected, as will be described further below. In some examples, four bits are selected from the error value.

Further during the second iteration, the multiplexer circuit 105 may be configured to provide the digital representation of the error to the Booth encoder circuit 112. The digital representation of the error may be provided to a binary Booth encoder, and need not be provided to a redundant binary Booth encoder. The multiplexer circuit 108 may be configured to provide the multiplier circuit 110 with the numerator from the previous iteration ($N_{i-1}$), which may be stored in one or more of the flip-flop circuits 130,131. The multiplier circuit 110 may be configured to multiply the previous numerator with the sum of the error and the squared error term. The sum may be implemented as a part of the operation of the multiplier circuit 110 and a separate addition may not be needed in some examples.

Generally, during operation, the multiplier circuit 110 may be configured to receive a digital representation of a value from the multiplexer circuit 108, and digital representations of error values and/or squared error values from the multiplexer circuit 107 and square circuit 102-103. The multiplier circuit 110 may be implemented using one or more logic circuits configured to multiply received values. In some example, the multiplier circuit may advantageously include Booth recoder circuit 112.

The Booth recoder circuit 112 may be configured to encode a digital representation of an error value received from the multiplexer circuit 107 and a digital representation of a square of the error value received from the square circuits 102-103 in accordance with Booth encoding techniques. That is, the Booth encoder circuit 112 may generate encoded error and squared error digital representations that represent a next numerical factor ($F_i$). The multiplier circuit 110 may be configured to multiply the next numerical factor ($F_i$) with the previous numerator ($N_{i-1}$) and denominator ($D_{i-1}$) provided from the multiplier circuit 108 and flip-flop circuits 130, 131. The Booth encoding techniques are configured for use with the multiplier circuit 110 in that the multiplier circuit 110 may be configured to output a digital representation of a value equal to the value received from the multiplexer circuit 108 multiplied by the sum of values received from the multiplexer circuit 107 and square circuits 102 or 103. That is, the summing may occur in the multiplier circuit 110 and a separate addition circuit may not be required in some examples.

Booth encoding techniques may be implemented using any suitable logic circuit configured to encode binary digits. Booth encoding, as will be understood to those reading the present disclosure, generally maps pairs of digits in an incoming signal to one of three output digits 0, +1, or −1. So, in one example an input string 00 may be mapped to an output 0, an input string 01 may be mapped to an output +1, an input string 10 may be mapped to an output −1, and an input string 11 may be mapped to an output 0. The mapping may simplify the use of the encoded digit string in later multiplication, as will be understood to those reading the present disclosure.

In some examples, radix-4 multipliers may be configured to cooperate with Booth encoders to implement the multiplier circuit 110 and Booth encoder circuit 112. In some examples, radix-8 multipliers may configured to cooperate with Booth encoders to implement the multiplier circuit 110 and Booth encoder circuit 112.

Referring again to FIG. 1, during the second iteration of the division, the multiplier circuit 110 may be configured to multiply the numerator from the previous iteration ($N_{i-1}$) with the second factor as represented by the encoded error and approximate squared error digital representations. The product of the numerator and the second numerical factor may approximate a quotient, and may be stored in the output registers 140 and/or provided to one or more of the flip-flop circuits 130,131 for use in a next iteration.

In some examples, another iteration may be performed. Accordingly, the multiplier circuit 110 may be configured to multiply the denominator from the previous iteration ($D_{i-1}$) with the second factor as represented by the encoded error and approximate squared error digital representations. A digital representation of the product of the denominator and the second numerical factor may be provided to one or more of the flip-flop circuits 130, 131 for use in the next iteration.

For the third iteration, a digital representation of an error of the denominator from the second iteration may be generated by the error generator circuit 109. In some examples the squaring circuit 103 may be enabled by the multiplexer circuit 106, and selected bits of the digital representation of the error provided to the square circuit 103. The square circuit 103 may be configured to generate a digital representation of a square of the value represented by the selected bits and provide the digital representation to the redundant Booth recoder 114. The multiplexer circuit 107 may be configured to provide a digital representation of the error to the Booth recoder 112, and the multiplier circuit may be configured to generate a digital representation of the product of the numerator from the previous iteration ($N_{i-1}$) and a sum of the error and approximate square of the error. In some examples, however, square circuit 103 may not be used during a third iteration, and a quadratic order convergence operation may instead be used. That is, the square circuit 103 may not be enabled, and the multiplier circuit 110 may be configured to generate a digital representation of a product of the numerator from the previous iteration and the error provided by the multiplexer circuit 107. In this manner, some convergence benefit may be obtained in the second iteration, but also some computational time and/or power saved in the third iteration.

Round constant storage 124, exponent storage 126, and round circuit 120 may be optionally provided for the processing of values received by the apparatus 100 in floating point format. An exponent associated with the numerator and with the denominator may be provided to the input registers 135 and stored in the exponent storage 126. Once the multiplier circuit 110 has generated an approximation of the quotient, the approximated quotient may be provided by the multiplier circuit 110 to the round circuit, rounded, and combined by output register 140 with the exponent from the exponent storage 126 to generate a floating point representation of the approximate quotient, as will be understood to those reading the present disclosure.

Figure 2:
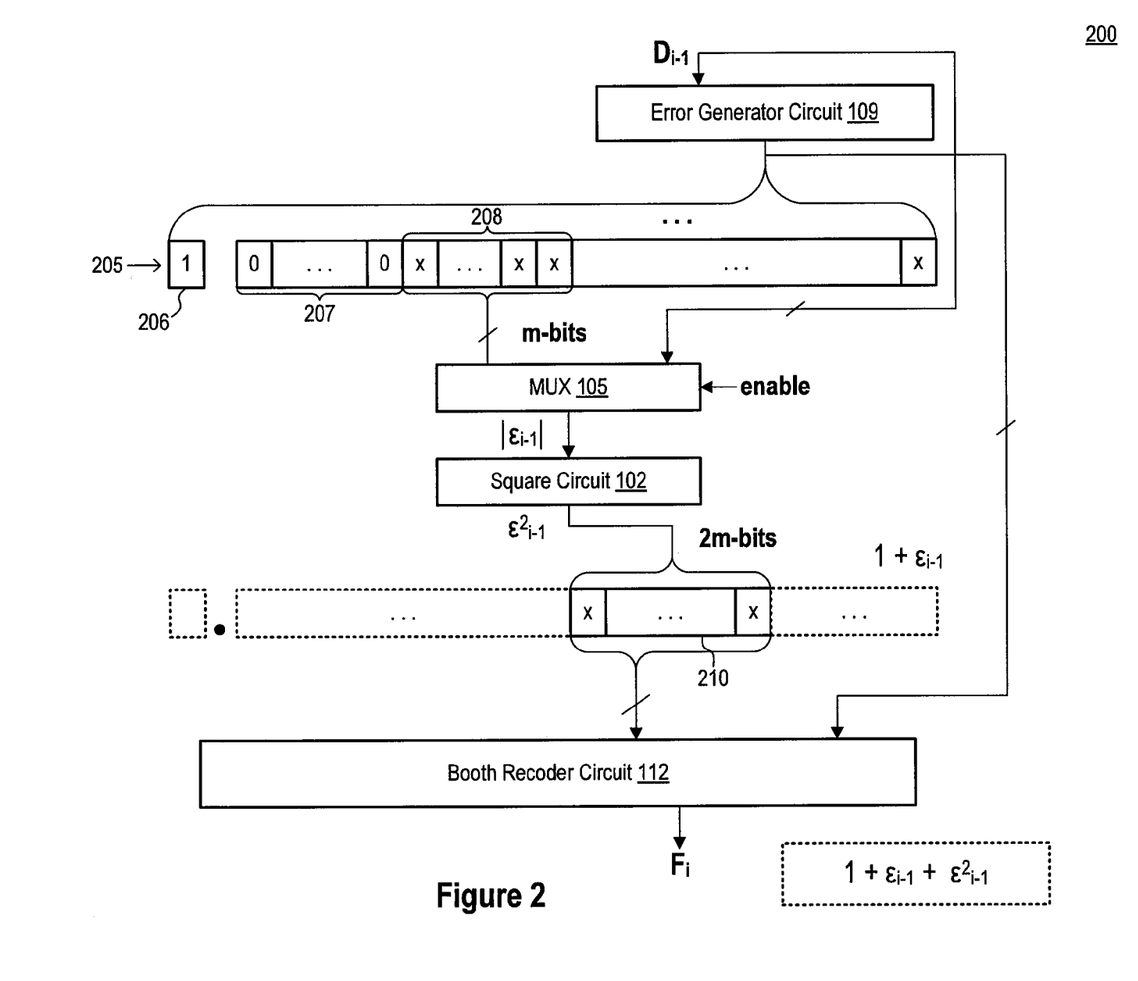
FIG. 2 is a schematic illustration of an apparatus for generating a digital representation of numerical factor for use in Goldschmidt division.

FIG. 2 is a schematic illustration of an apparatus 200 for generating a digital representation of numerical factor for use in Goldschmidt division, arranged in accordance with at least some examples of the present disclosure. The apparatus 200 may include error generator circuit 109, multiplexer circuit 105, square circuit 102, and/or Booth recoder 112. The error generator circuit may be configured to generate a digital representation of an error 205 and may be coupled to the multiplexer circuit 105. The multiplexer circuit may be coupled to the square circuit 102. The square circuit may be configured to generate a digital representation 210 of a square of a value represented by the selected bits of the error and may be coupled to the Booth recoder 112.

A digital representation of a denominator, $D_{i-1}$, from a previous iteration may be provided to the error generator circuit 109, for example by one or more of the flip-flop circuits 130,131 of FIG. 1. The error generator circuit 109 may be configured to generate a one's complement of the denominator $D_{i-1}$. The one's complement is shown as $1+\epsilon_{i-1}$ in FIG. 2, and illustrated schematically as 205. The one's complement includes a plurality of bits and may generally have a leading 1 bit, illustrated schematically as 206, followed by a number of consecutive 0 bits, illustrated schematically as 207. As the iterations progress, the error will become smaller, and the number of initial consecutive 0s of the one's complement 205 may generally grow. The number of initial consecutive 0s may be known for each iteration based on the precision of the initial table of stored factors.

Accordingly, the multiplexer circuit 105 may be configured to select a number of bits of the error starting at a position following the number of initial consecutive 0s. The selected bits are shown schematically in FIG. 2 as the bits 208 and their value represented schematically as 'x' because the bit values may be any combination of 1s and 0s. Any number of bits may be selected, and the number of bits may be selected based on performance specifications for the division operation. In some examples, four bits are used, but one, two, three, four, five, six, seven, eight, nine, ten, or another number of bits may be selected in other examples. As stated above, the number of initial consecutive 0s may change for each iteration, accordingly, although a same number of bits may be selected by the multiplexer circuit and provided to the square circuit each iteration, the position of those bits may change. In particular, the multiplexer circuit may select a number of bits starting at a position following the initial consecutive 0s.

The multiplexer circuit 105 may include a control terminal, and may receive a control signal from a microcontroller (not shown in FIG. 2) to enable and/or control the multiplexer circuit 105 when during an iteration when an approximate square of an error is to be calculated. The square circuit 102 may also be enabled or disabled responsive to a control signal from a microcontroller and/or the multiplexer circuit 105, such that the square circuit 102 may be enabled during iterations where the square of an error signal may be calculated. Where multiple square circuits are provided, the square circuit 102 may be enabled during iterations where the particular unit is to calculate an approximate square.

The selected bits are provided to square circuit 102. The square circuit 102 squares the selected bits to generate an approximation of a square of the error, $\epsilon^2_{i-1}$. The squaring operation may double the number of bits, accordingly, the digital representation of the square of the selected number of bits may have twice the selected number of bits. The Booth recoder 112 may be configured to receive both the digital representation of the approximate square 210 and the digital representation of the error 205. The Booth recoder 112 is configured to encode the digital representation of the error and approximate square of the error in accordance with Booth recoding techniques for carry-save representations. The encoded digital representations may then represent a second numerical factor $F_i$ for use in Goldschmidt division, where $F_i$ is approximately $1+\epsilon_{i-1}+\epsilon^2_{i-1}$.

Figure 3:
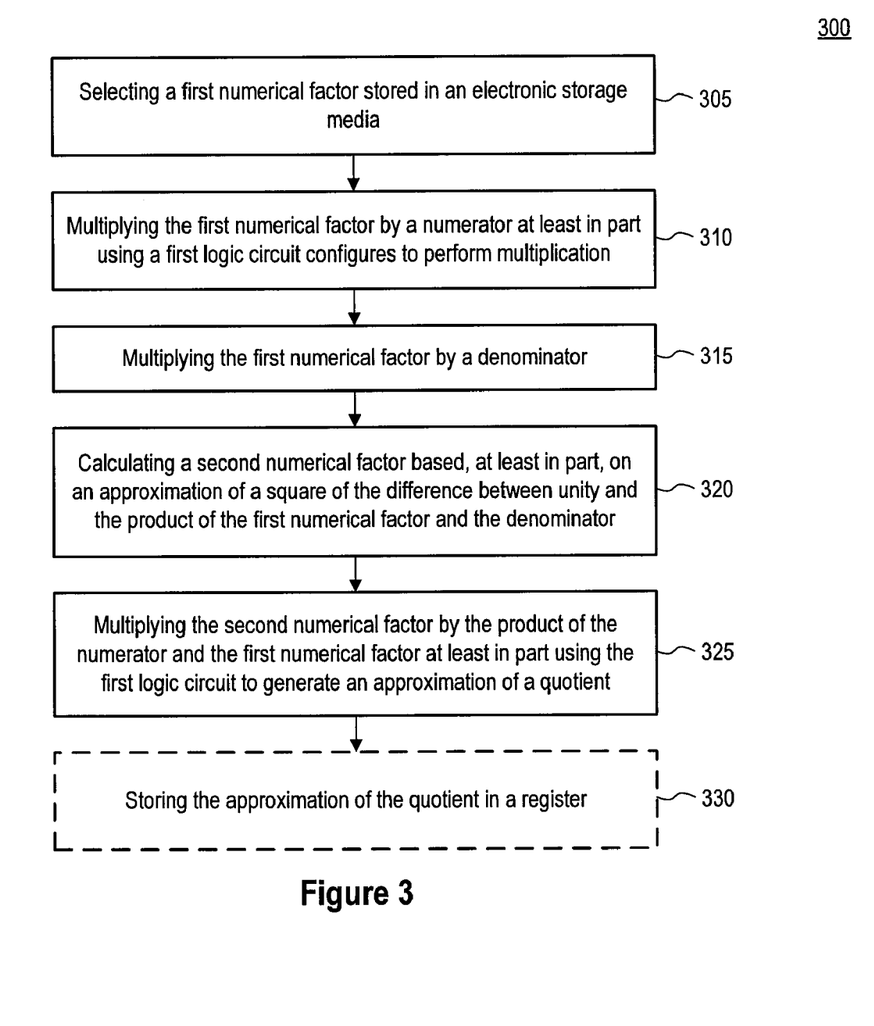
FIG. 3 is a flow diagram illustrating an example method.

FIG. 3 is a flow diagram illustrating an example method arranged in accordance with at least some examples of the present disclosure. The method 300 may include one or more functions, operations, or actions as is illustrated by one or more of blocks 305, 310, 315, 320, 325, and/or 330. The various blocks described herein may be performed sequentially, in parallel, or in a different order than those described herein. It should also be appreciated that in some implementations one or more of the illustrated blocks may be eliminated, combined or separated into additional blocks.

The example method may begin at block 305, "selecting a first numerical factor stored in an electronic storage media." Block 310 may follow block 305, "multiplying the first numerical factor by a numerator at least in part using a first logic circuit configured to perform multiplication." Block 315 may follow block 310, "multiplying the first numerical factor by a denominator." Block 320 may follow block 315, "calculating a second numerical factor based, at least in part, on an approximation of a square of the difference between unity and the product of the first numerical factor and the denominator." Block 325 may follow block 320, "multiplying the second numerical factor by the product of the numerator and the first numerical factor at least in part using the first logic circuit, to generate an approximation of a quotient." Block 330 may follow block 325, "storing the approximation of the quotient in a register."

In block 305, a first numerical factor may be selected from an electronic storage media. The selection may be performed, for example, by a microcontroller or other processing unit arranged in communication with the electronic storage media. As has generally been described above, a finite number of numerical factors may be stored and the factor may be chosen which is closest to a reciprocal of a denominator. In this manner, the amount of storage media devoted to storage of the first numerical factors may be used to determine a precision of a first Goldschmidt division iteration. Examples of the present disclosure may provide faster convergence of a Goldschmidt division, and accordingly may allow for smaller storage media requirements for storage of initial numerical factors. Not all examples of the disclosure may achieve these benefits, however.

In block 310, the first numerical factor may be multiplied by a numerator. The multiplication may be performed by a logic circuit configured to perform multiplication. In some examples, as has been described above, Booth multiplication may be used.

In block 315, the first numerical factor may be multiplied by a denominator. The multiplication may be performed by a logic circuit configured to perform multiplication. In some examples, as has been described above, Booth multiplication may be used. The same or a different logic circuit may be used as in block 310.

Representations of the product of the numerator and denominator with the first numerical factor may be stored, for example, using one or more flip-flop circuits as generally described above. These products may be used during subsequent iterations of divisions described herein.

In block 320, a second numerical factor may be calculated based, at least in part, on an approximation of a square of the difference between unity and the product of the first numerical factor and the denominator. The square of the difference between unity and the product of the first numerical factor and denominator may be performed, for example, by a logic circuit configured to compute a square. In some examples, as described above, an error may be calculated between unity and the product of the first numerical factor and denominator, such as by a logic circuit configured to take a one's complement of the product of the first numerical factor and the denominator. In some examples, selected bits of the error may be squared by a logic circuit configured to generate a digital representation of a square of an input value.

In block 325, the second numerical factor may be multiplied by the product of the numerator and the first numerical factor. A logic circuit configured to perform multiplication may be used to perform the multiplication in block 325, and it may be the same or a different logic circuit as those used in blocks 310 and/or 315. The product generated in the block 325 may approximate a quotient of the numerator and the denominator. Prior to the multiplication, one or more of a digital representation of the error and a digital representation of the approximate square of the error may be encoded in accordance with Booth encoding techniques, which may facilitate the multiplication when a Booth multiplier circuit is used.

In block 330, the approximation of the quotient may be stored in a register. The approximation may be stored as a digital representation of the quotient, and may be accessed and utilized by other components of a computing device in communication with the register. In this manner, division of a numerator and a denominator may be performed by logic circuitry.

Figure 4:
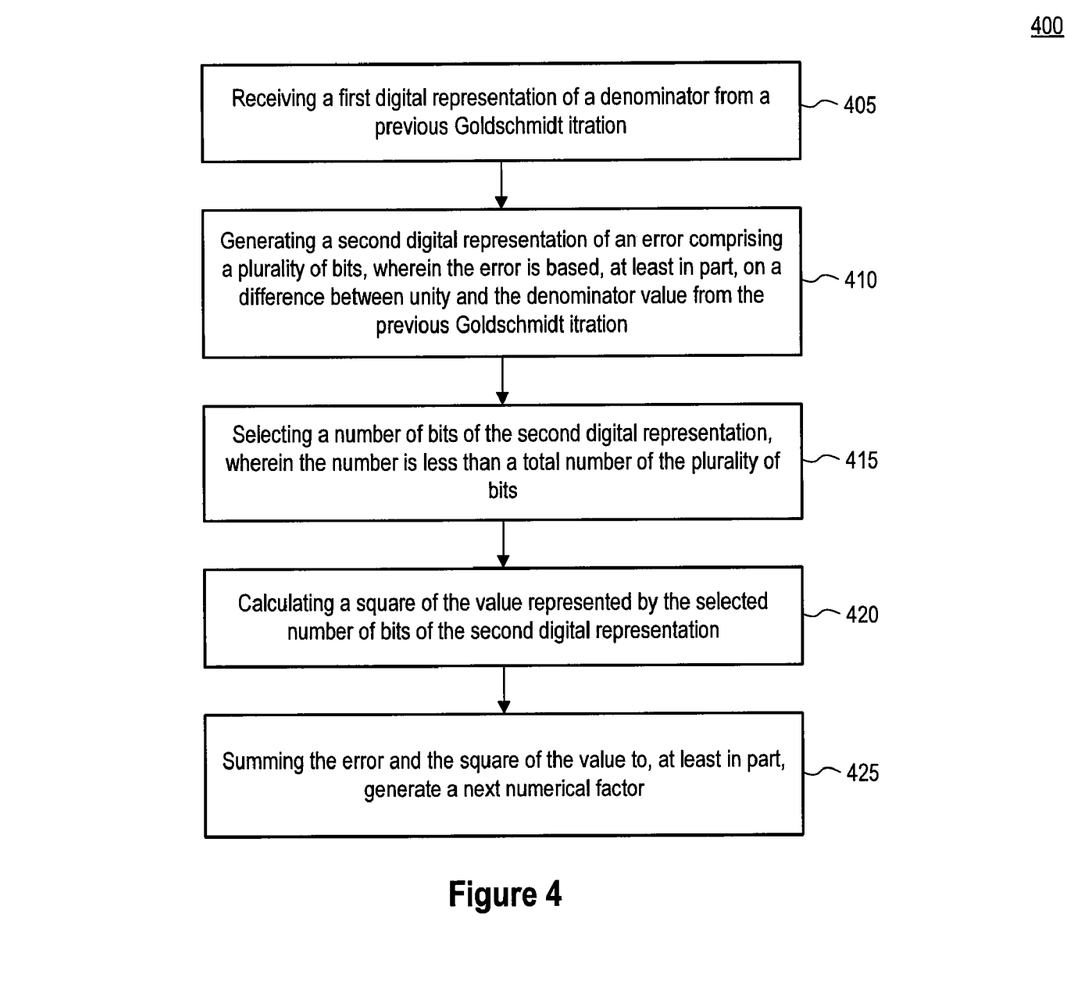
FIG. 4 is a flow diagram illustrating an example method.

FIG. 4 is a flow diagram illustrating an example method arranged in accordance with at least some examples of the present disclosure. The method 400 may include one or more functions, operations, or actions as is illustrated by one or more of blocks 405, 410, 415, 420, and/or 425. The various blocks described herein may be performed sequentially, in parallel, or in a different order than those described herein. It should also be appreciated that in some implementations one or more of the illustrated blocks may be eliminated, combined or separated into additional blocks.

The example method may begin at block 405, "receiving a first digital representation of a denominator from a previous Goldschmidt iteration." Block 410 may follow block 405, "generating a second digital representation of an error comprising a plurality of bits, wherein the error is based, at least in part, on a difference between unity and the denominator value from the previous Goldschmidt iteration." Block 415 may follow block 410, "selecting a number of bits of the second digital representation, wherein the number is less than a total number of the plurality of bits." Block 420 may follow block 415, "calculating a square of the value represented by the selected number of bits of the second digital representation." Block 425 may follow block 420, "summing the error and the square of the value to, at least in part, generate a next numerical factor."

In block 405, a first digital representation of a denominator from a previous Goldschmidt iteration may be received. Referring back to FIG. 1, the digital representation of the denominator may be received by, for example, error generator circuit 109 which may be logic circuit configured to take a one's complement of the digital representation. The digital representation may be received from, for example, one or more of the flip-flop circuits 130,131.

In block 410, a second digital representation of an error may be generated, for example, by the error generator circuit 109 which may be a logic circuit configured to generate a one's complement of the digital representation. The error may be based, at least in part, on a difference between unity and the denominator from the previous Goldschmidt iteration.

In block 415, a number of bits of the second digital representation may be selected, for example by a multiplexer circuit in accordance with a control signal received from a microcontroller. The number of selected bits may be less than a total number of the plurality of bits, and in one example may be four bits. The number of bits may be selected beginning with a bit following an initial string of consecutive 0s in the digital representation of the error, as described generally above. The location of the selected bits may change at different iterations of the Goldschmidt division in some examples, as the initial string of consecutive 0s may be longer during later iterations. That is, the bits may be selected based, at least in part, on a number of iterations of the Goldschmidt division technique performed.

In block 420, a square of the value represented by the selected number of bits may be calculated, for example by one or more logic circuits configured to generate a square of an input value. The square of the value represented by the selected number of bits may approximate a square of the error. In this manner, a digital representation of an approximate square of the error may be generated.

In block 425, the digital representation of the error and the digital representation of the square of the value may be summed, in part, to generate a next numerical factor for use in a Goldschmidt division. The digital representations may be summed using a logic circuit configured to perform addition. In some embodiments, one or more of the digital representations may be encoded using Booth encoding techniques and the summing may occur as part of a Booth multiplication with the numerator, denominator, or both from a previous Goldschmidt iteration.

In some examples, a digital representation of the next numerical factor may not itself be generated. The next numerical factor may instead be specified by a combination of the digital representations of the error and the approximate square and used by a Booth multiplier circuit. In some examples, however, a digital representation of the next numerical factor may be generated and may be stored in a register. The next numerical factor may be multiplied by numerator and/or denominator values from a previous iteration using any logic circuitry configured to perform multiplication.

Figure 5:
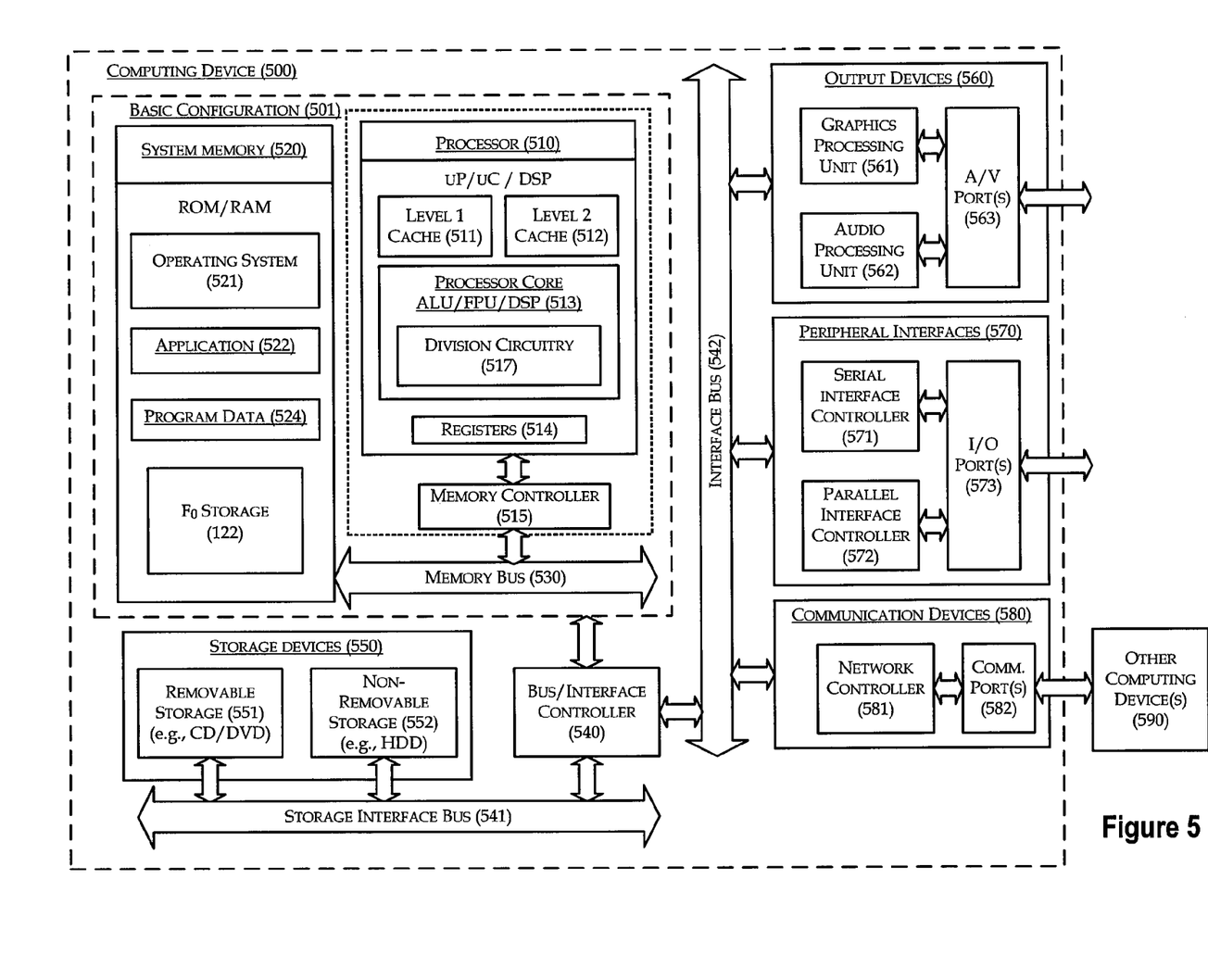
FIG. 5 is a block diagram illustrating an example computing device 500 that is arranged to implement division, all arranged in accordance with at least some embodiments of the present disclosure.

FIG. 5 is a block diagram illustrating an example computing device 500 that is arranged to implement division in accordance with at least some examples of the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 may be of any type including but not limited to a microprocessor ($\mu$P), a microcontroller ($\mu$C), a digital signal processor (DSP), or any combination thereof. Processor 510 may include one more levels of caching, such as a level one cache 511 and a level two cache 512, a processor core 513, and registers 514. An example processor core 513 may include an arithmetic logic unit (ALU), a floating point unit (FPU), a digital signal processing core (DSP Core), or any combination thereof. The processor core 513 may include logic circuitry for performing division 517 arranged in accordance with examples of the present disclosure. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. During execution of the operating system 521 and/or applications 522, division operations may be required which may be executed by the division circuitry 517. System memory 620 may also include $F_0$ storage 122 encoding initial numerical factors for use by the division circuitry 517. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which may be configured to communicate to various external devices such as a display or speakers via one or more A/V ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular examples described in this application, which are intended as illustrations of various aspects. Many modifications and examples can may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method for dividing a numerator by a denominator, the method comprising:
    selecting a first numerical factor stored in an electronic storage media;
    multiplying the first numerical factor by the numerator at least in part using a first logic circuit configured to perform multiplication; multiplying the first numerical factor by the denominator;
    calculating a second numerical factor based, at least in part, on an approximation of a square of the difference between unity and the product of the first numerical factor and the denominator;
    multiplying the second numerical factor by the product of the numerator and the first numerical factor at least in part using the first logic circuit, to generate an approximation of a quotient of the numerator and the denominator; and
    storing the approximation of the quotient in a register.

2. The method of claim 1, wherein calculating the second numerical factor comprises Booth encoding the approximation of the square of the difference between unity and the product of the first numerical factor and the denominator.

3. The method of claim 1, wherein the second numerical factor is further based, at least in part, on a combination of the approximation of the square of the difference and the difference between unity and the product of the first numerical factor and the denominator.

4. The method of claim 1, wherein the product of the first numerical factor and the denominator is represented as a plurality of bits, and wherein calculating the second numerical factor comprises squaring a value represented by a selected number of bits of the plurality of bits, wherein the selected number is fewer than all of the plurality of bits.

5. The method of claim 1, further comprising calculating an error between unity and the product of the first numerical factor and the denominator.

6. The method of claim 5, wherein the product of the first numerical factor and the denominator is represented by a plurality of bits and wherein calculating the error comprises taking a one's complement of the plurality of bits.

7. A method for computing a next numerical factor for use in a Goldschmidt division technique, wherein multiplication of the next numerical factor by a numerator value from a previous Goldschmidt iteration approximates a quotient of a numerator and a denominator, the method comprising:

receiving a first digital representation of a denominator value from a previous Goldschmidt iteration;

generating, by an error generator circuit, a second digital representation of an error comprising a plurality of bits, wherein the error is based, at least in part, on a difference between unity and the denominator value from the previous Goldschmidt iteration;

selecting a number of bits of the second digital representation, wherein the number is less than a total number of the plurality of bits;

calculating a square of the value represented by the selected number of bits of the second digital representation; and summing the error and the square of the value to, at least in part, generate the next numerical factor.

8. The method of claim 7, wherein generating the second digital representation comprises taking a one's complement of the first digital representation.

9. The method of claim 7, wherein selecting the number of bits comprises selecting bits based, at least in part, on a number of iterations of the Goldschmidt division technique performed.

10. The method of claim 7, wherein summing the error and the square of the value comprises providing the second digital representation and a third digital representation of the square of the value to a Booth encoder.

11. The method of claim 7, further comprising storing the next numerical factor in a register.

12. The method of claim 7, further comprising generating the first digital representation at least in part using a logic circuit configured to perform multiplication.

13. The method of claim 7, wherein selecting the number of bits of the error comprises enabling a multiplexer circuit to select the number of bits.

14. An apparatus configured to divide a numerator by a denominator, the apparatus comprising:

a multiplier circuit having a first input terminal, a second input terminal, and a first output terminal, wherein the multiplier circuit is configured to receive a digital representation of a first value at the first input terminal, a digital representation of a second value at the second input terminal, and provide an output signal representing a product of the first and second values at the first output terminal;

an error generator circuit having a third input terminal and a second output terminal, wherein the third input terminal is coupled to the first output terminal of the multiplier circuit, and wherein the error generator circuit is configured to receive the output signal from the multiplier circuit at the third input terminal and generate an error signal at the second output terminal;

a square circuit having a fourth input terminal and a third output terminal, wherein the fourth input terminal is coupled to the second output terminal of the error generator circuit, and wherein the square circuit is configured to receive selected bits of the error signal and generate a digital representation of a square of the selected bits of the error signal at the third output terminal, wherein the selected bits of the error signal are fewer than a total number of bits of the error signal at the second output terminal; and a Booth encoder circuit having a fifth input terminal and a sixth input terminal, wherein the fifth input terminal is coupled to the second output terminal of the error generator circuit, the sixth input terminal is coupled to the third output terminal of the square circuit, and the Booth encoder circuit is further coupled to the multiplier circuit, wherein the Booth encoder circuit is configured to encode the error signal and the digital representation of the square of the selected bits in accordance with a Booth encoding technique, and wherein the Booth encoder circuit is further configured to provide the encoded error signal and the encoded digital representation of the square of the selected bits to the first input terminal of the multiplier circuit.

15. The apparatus of claim 14, wherein the selected bits of the error signal are selected in accordance with a control signal from a microcontroller.

16. The apparatus of claim 14, wherein the error signal comprises a one's complement of the output signal received at the third input terminal.

17. The apparatus of claim 14, further comprising a multiplexer circuit having a seventh input terminal and an eighth input terminal, wherein the seventh input terminal is coupled to the second output terminal of the error generator circuit and the eighth input terminal is coupled to a storage medium configured to store representations of numerical factors, wherein the multiplexer circuit is configured to provide either a representation of a numerical factor or the error signal to the first input terminal of the multiplier circuit in accordance with a control signal.

18. The apparatus of claim 14, further comprising a multiplexer circuit coupled to the multiplier circuit, wherein the multiplexer circuit is configured to receive a digital representation of a numerator, receive a digital representation of a denominator, receive the output signal generated by the multiplier circuit, wherein the multiplexer circuit is configured to provide a selected one of the digital representation of the numerator, the digital representation of the denominator, or the output signal generated by the multiplier circuit to the second input terminal of the multiplier circuit in response to a control signal.

19. The apparatus of claim 14, wherein the squaring circuit comprises a first square circuit, wherein the selected bits are a first set of selected bits, the apparatus further comprising: a second square circuit having a seventh input terminal and a fourth output terminal, wherein the seventh input terminal is coupled to the second output terminal of the error generator circuit, the fourth output terminal is coupled to an input of the Booth encoder circuit, and the second square circuit is configured to receive a second set of selected bits of the error signal, wherein at least one of the second set of selected bits is different than the first set of selected bits, and generate a digital representation of a square of the second set of selected bits of the error signal at the fourth output terminal.

20. The apparatus of claim 14, further comprising a multiplexer circuit coupled between the second output terminal of the error generator circuit and the fourth input terminal of the square circuit, and wherein the multiplexer circuit is configured to select the selected bits of the error signal and provide the selected bits of the error signal to the square circuit in response to a control signal.

21. The apparatus of claim 14, further comprising a register coupled to the first output terminal of the multiplier circuit, wherein the register is configured to store the output signal.

* * * * *